United States Patent [19]

Nelson

[11] Patent Number: 5,752,385
[45] Date of Patent: May 19, 1998

[54] ELECTRONIC CONTROLLER FOR LINEAR CRYOGENIC COOLERS

[75] Inventor: Arthur Randall Nelson, Davenport, Iowa

[73] Assignee: Litton Systems, Inc., Davenport, Iowa

[21] Appl. No.: 563,938

[22] Filed: Nov. 29, 1995

[51] Int. Cl.$^6$ ............................... F25R 9/00; H02H 5/04
[52] U.S. Cl. ............................... 62/6; 62/228.1; 62/230; 361/24
[58] Field of Search ............... 62/6, 228.1, 51.1, 62/230; 361/24; 417/44.11

[56] References Cited

U.S. PATENT DOCUMENTS

| | | | |
|---|---|---|---|
| 4,361,011 | 11/1982 | Callender et al. | 62/228.1 X |
| 5,018,357 | 5/1991 | Livingston et al. | 62/228.1 X |
| 5,531,074 | 7/1996 | Katagiri et al. | 62/6 |
| 5,572,879 | 11/1996 | Harrington et al. | 62/230 X |

Primary Examiner—William E. Wayner
Attorney, Agent, or Firm—Michael H. Wallach

[57] ABSTRACT

A highly efficient motor driver circuit of an electronic controller for linear cryogenic coolers operates directly from a variable power supply, such as a battery, without the need for the voltage regulator control circuit of the prior art. Elimination of the prior art voltage regulator ensures a higher efficiency motor driver circuit of the electronic controller. Both open-loop and closed-loop controllers electronically control the motor driver circuit. The open-loop controller protects against temperature sensor failure, and will limit maximum motor power as a function of system ambient temperature. The closed-loop controller regulates the temperature of the cold finger accurately to a preset value, using feedback from a temperature sensor along with a novel pulse-width modulation concept for modifying motor drive waveforms. The motor driver circuit provides the advantages of increased efficiency, operation from a variable power source, tight control of temperature regulation, a fail-safe mode of temperature sensor feedback, and a small envelope space enabling electronic controller mounting internal to the cooler motor/compressor assembly of a linear cryogenic cooler.

22 Claims, 11 Drawing Sheets

FIG. 10
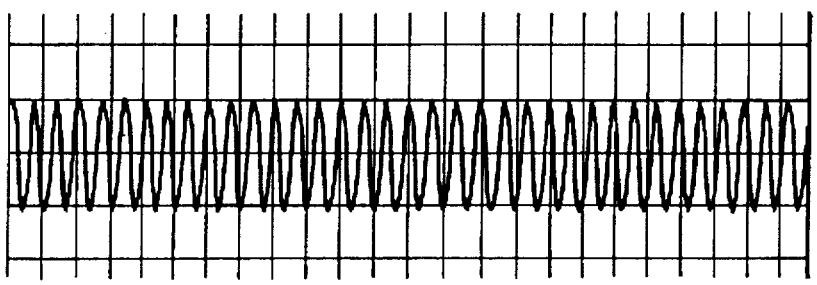
100% DUTY CYCLE
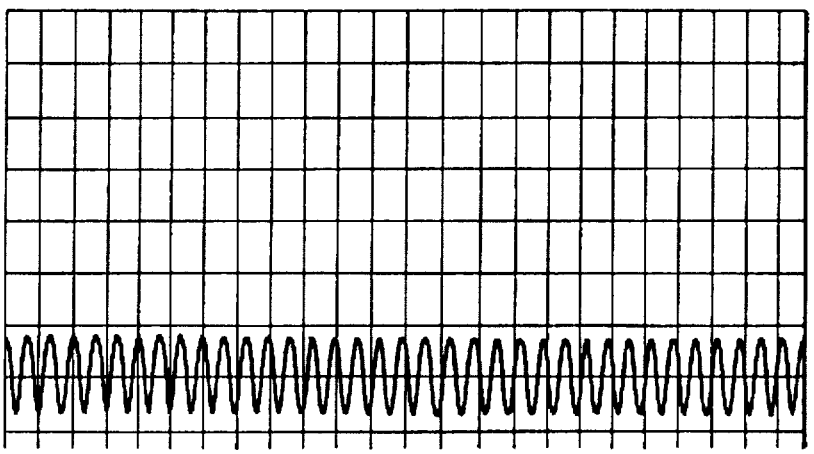
50% DUTY CYCLE
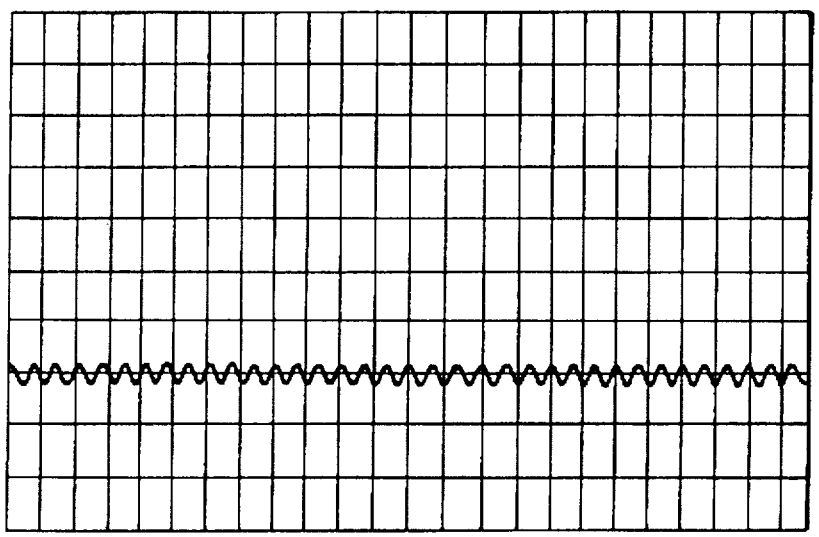
10% DUTY CYCLE

ELECTRONIC CONTROLLER FOR LINEAR CRYOGENIC COOLERS

BACKGROUND OF THE INVENTION

The present invention relates generally Linear Cryogenic Coolers, and more specifically to Electronic Controllers for Linear Cryogenic Coolers.

Linear Cryogenic Coolers are required to cool infrared detectors to the cryogenic temperatures required for their proper operation. Infrared detectors are used in many applications, such as night vision devices and heat-seeking weapons, in which infrared detector temperature is a critical parameter.

Linear Cryogenic Coolers commonly utilize a cooler motor to power a cooling compressor. The cooling motor is typically controlled by cooler motor driver electronics circuitry, which determines characteristics of the electrical power applied to the cooler driver motor. These electrical characteristics are directly interrelated with cooling system efficiency and performance, since the cooler motor drive waveform determines the extent to which compressor piston displacement is controlled, and operational control characteristics. An optimum linear cooling system must control piston displacement as a function of detector temperature and other system variables, such as pressure, temperature, dynamic system response with individual component transfer functions changing during cool-down, and accuracy and loop dynamics required for final temperature stabilization and maintenance.

Previous cooler motor drivers use an adjustable voltage regulator to provide a controlled supply voltage to the cooler motor driver electronics circuit. A temperature feedback circuit is then used to control the set point of the adjustable voltage regulator, thereby varying the power to the cooler motor. By varying the supply voltage, the amplitude of the motor driver signal could be controlled as a function of temperature.

A block diagram of this type of prior art linear cryogenic cooling system is shown in FIG. 1. The Supply Voltage 12 applied to Voltage Regulator 14 can be either a fixed or a variable DC voltage. Adjustable Voltage Regulator 14 produces Voltage Regulator output signal 24, the magnitude of which is controlled by Temperature Sensor Feedback signal 30. Voltage Regulator output signal 24 is applied to Motor Driver 16, which is an electronic switching circuit which produces Motor Driver output signal 26. A typical waveshape of Motor Driver output signal 26 is also shown in FIG. 1. Motor Driver output signal 26 is applied to and controls Cooler Motor 18. Cooler Motor 18 is used to remove heat from a target device, and the actual temperature of the target device to be cooled is monitored by Temperature Sensor 20. The output signal of Temperature Sensor 20 is Temperature Sensor signal 28, which represents a measure of the target device temperature. Temperature Sensor Feedback 22 modifies Temperature Sensor signal 28 as required for proper closed-loop operation, and produces Temperature Sensor Feedback signal 30. Temperature Sensor Feedback signal 30 is applied to Voltage Regulator 14 and is used to vary the value of Voltage Regulator output signal 24 as required to maintain constant target device temperature, thereby controlling the setpoint of Voltage Regulator 14. One disadvantage of a cooling system based on this prior art approach is the large amount of power dissipated in Voltage Regulator 14 and the associated heat generated. Using a voltage regulator in this manner is power inefficient; with 10% to 20% loss in efficiency of Voltage Regulator 14 being common.

Additionally, many linear cryogenic cooling systems are required to operate from battery sources, where efficiency is important and in some cases paramount. The magnitude of the voltage from a battery source will typically vary as the result of removing energy from the battery over a period of time. It is not uncommon to experience a voltage range of 17 to 32 volts direct current (VDC) from a nominal 28 VDC battery. It is therefore required that battery powered cooling systems be able to operate over a potentially wide range of supply voltage. Prior art linear cryogenic cooling technology, such as that disclosed in U.S. Pat. No. 5,156,005 to Redlich on Oct. 20, 1992 does not address this requirement, instead requiring a fixed 12 VDC supply voltage as shown in FIGS. 6 and 12. Because most cryogenic coolers operate from a D.C. battery supply, the cooler must operate at high efficiency from a wide range of supply voltage, such as 17–32 VDC.

Thus, there is an unmet need in the art to develop Electronic Controllers for Linear Cryogenic Coolers having the desirable operational characteristics of increased efficiency, wide supply voltage range, and automatic temperature failure protection while reducing or eliminating the prior art disadvantages discussed above.

In addition to the prior art problems discussed above, there is also a lack of uniformity in the prior art approaches which have been proposed thus far, as disclosed in U.S. Pat. No. 5,156,005 issued to Redlich on Oct. 20, 1992. Therefore, there is also an unmet need in the art to use one basic design approach for Electronic Controllers for Linear Cryogenic Coolers, instead of a multiplicity of design approaches, to ensure the maximum number of applications for a product.

SUMMARY OF THE INVENTION

It is an object of the present invention to provide a high efficiency Electronic Controller for Linear Cryogenic Coolers which would provide the desirable operational characteristics of increased efficiency, wide supply voltage range, and automatic temperature failure protection.

It is further an object of the present invention to provide a high efficiency Electronic Controller for Linear Cryogenic Coolers that can operate directly from a variable power supply, such as a battery supply.

It is yet another an object of the invention to use one basic design approach for Electronic Controllers for Linear Cryogenic Coolers, instead of a multiplicity of design approaches, to ensure the maximum number of applications for a product.

Therefore, according to the present invention, a highly efficient motor driver circuit of an electronic controller for linear cryogenic coolers operates directly from a variable power supply, such as a battery, without the need for the voltage regulator control circuit of the prior art. Elimination of the prior art voltage regulator ensures a higher efficiency motor driver circuit of the electronic controller.

The present invention has both open-loop and closed-loop controllers for electronically controlling the cooler motor used in linear cryogenic coolers. The open-loop controller protects against temperature sensor failure, and will limit maximum motor power as a function of system ambient temperature. The closed-loop controller regulates the temperature of the cold finger accurately to a preset value, using feedback from a temperature sensor along with a novel pulse-width modulation concept for modifying motor drive waveforms. Because pulse-width modulation, not amplitude modulation, is used to vary motor power, the techniques of this invention are impervious to the magnitude of available source voltage, which allows for the wide-range operation typically encountered in battery applications. Because higher efficiency is achieved and thus less heat is generated, a high degree of miniaturization is practical.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 10 is a graph of Output Pressure Waveform, for description of the preferred embodiment.

DESCRIPTION OF THE INVENTION

Figure 1:
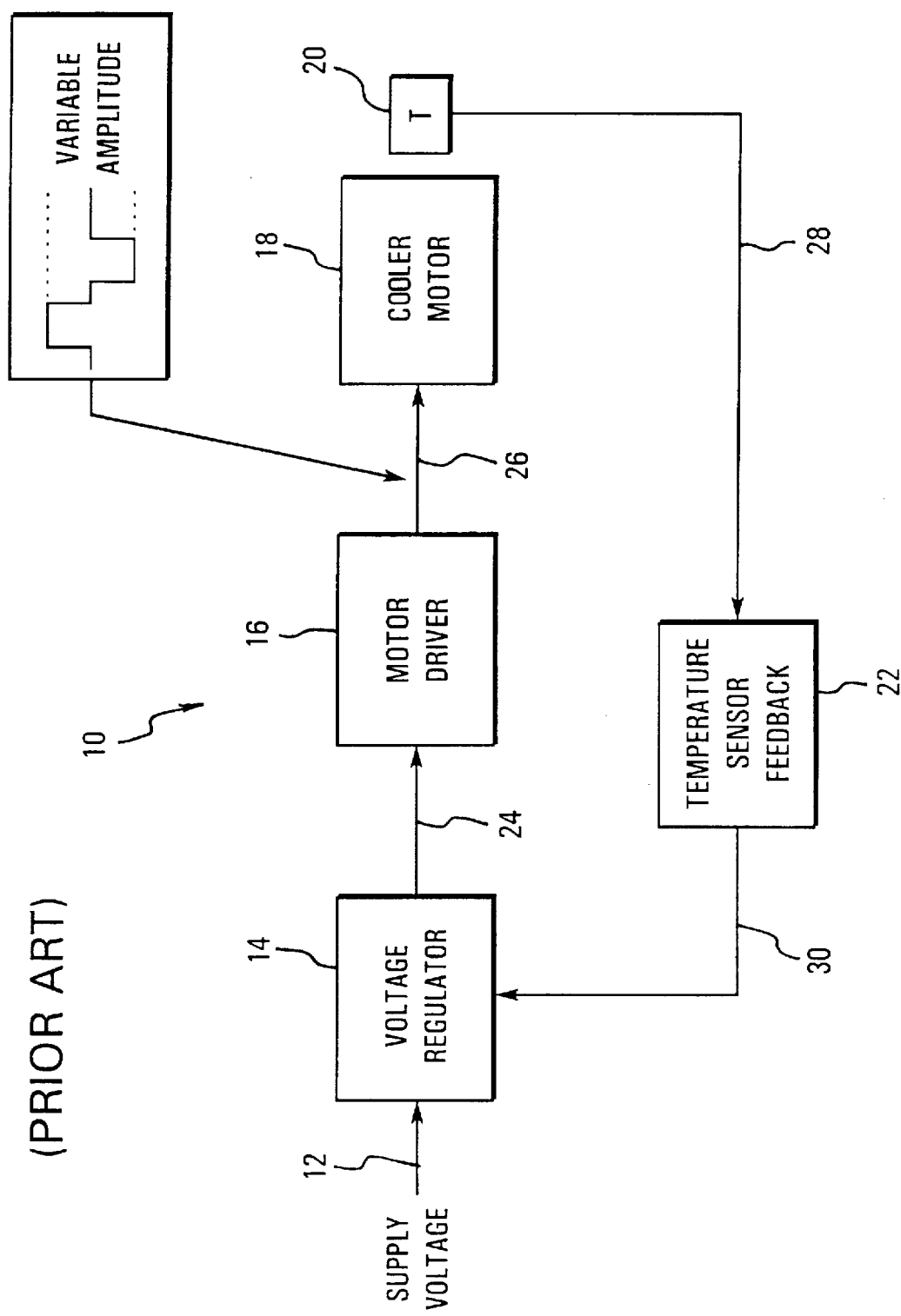
FIG. 1 is a Cooling System Block Diagram, according to the prior art.
Figure 2:
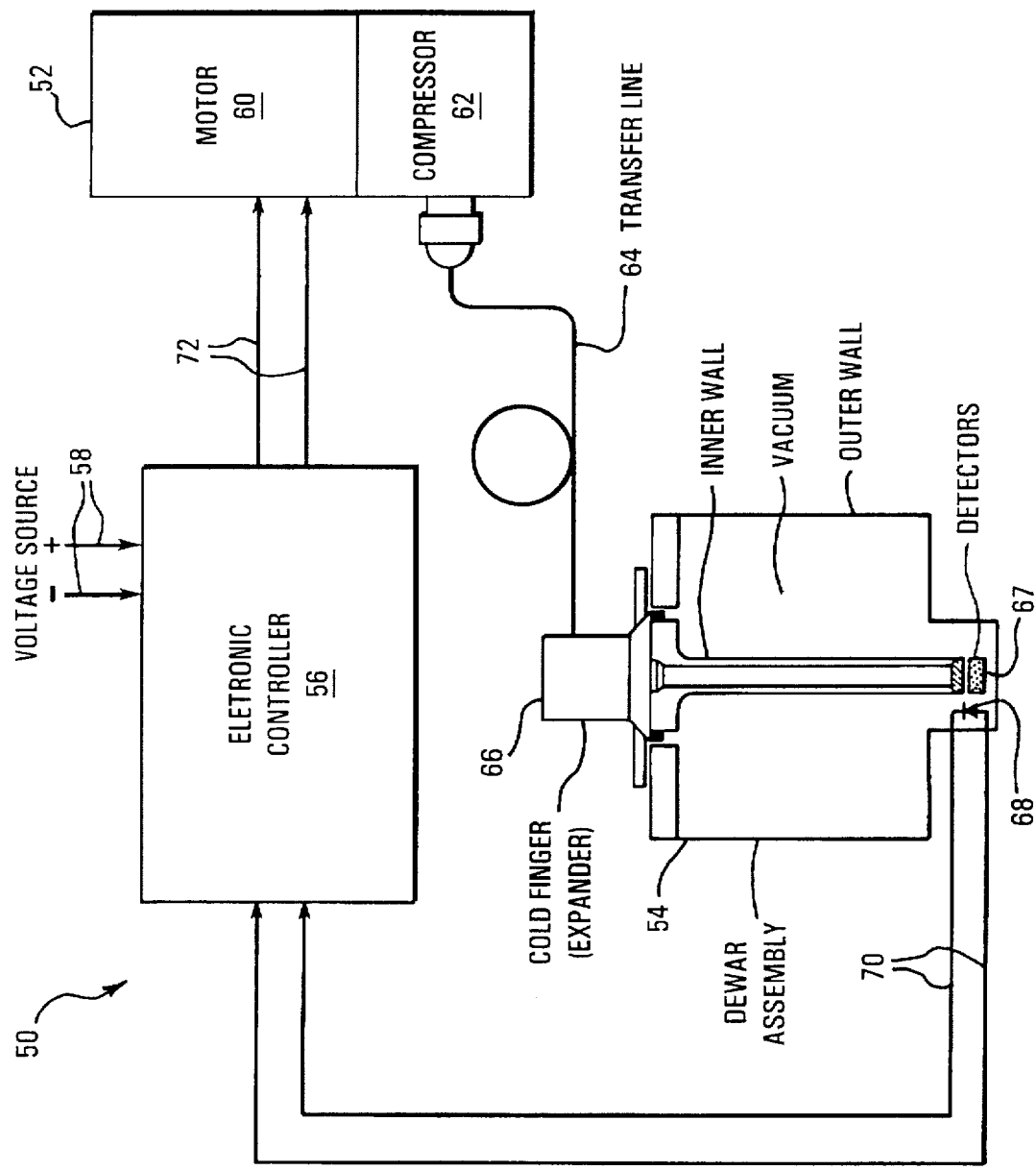
FIG. 2 is a Cooler Control System Block Diagram, according to a preferred embodiment of the present invention.

A cooler control system block diagram 10, according to the present invention, is shown in FIG. 2. The cooler control system 10 consists of Motor/Compressor Assembly 52, DEWAR Assembly 54 and Electronic Controller 56. Motor/Compressor Assembly 52 contains Motor 60 and Compressor 62. DEWAR Assembly 54, an insulated assembly, contains Cold Finger 66, Infrared Detectors 67, and Temperature Sensor 68. Electronic Controller 56 contains electronics circuitry which will be discussed later. Voltage Source 58 is typically approximately 17–32 VDC, although other voltage ranges may be utilized. Motor/Compressor Assembly 52 is connected to Cold Finger 66 by Transfer Line 64. Cold Finger 66 interfaces with DEWAR Assembly 54 which is a vacuum-jacketed glass tube that insulates Cold Finger 66 which is −193° Celsius or 80° Kelvin from surrounding ambient temperatures which are considerably warmer. Infrared Detectors 67 and Temperature Sensor 68 are attached on the vacuum side of the glass tube that is DEWAR Assembly 54. The Cold Finger 66 generates the refrigeration required to cool the Infrared Detectors 67 to their required operating temperature. Electronic Controller 56 interfaces to Motor/Compressor Assembly 52 and DEWAR Assembly 54 detector assembly, and provides the necessary controls to regulate the detector's temperature to a preset value. Temperature Sensor Signal 70 electrically represents target device temperature and is applied as an input signal to Electronic Controller 56.

Figure 3:
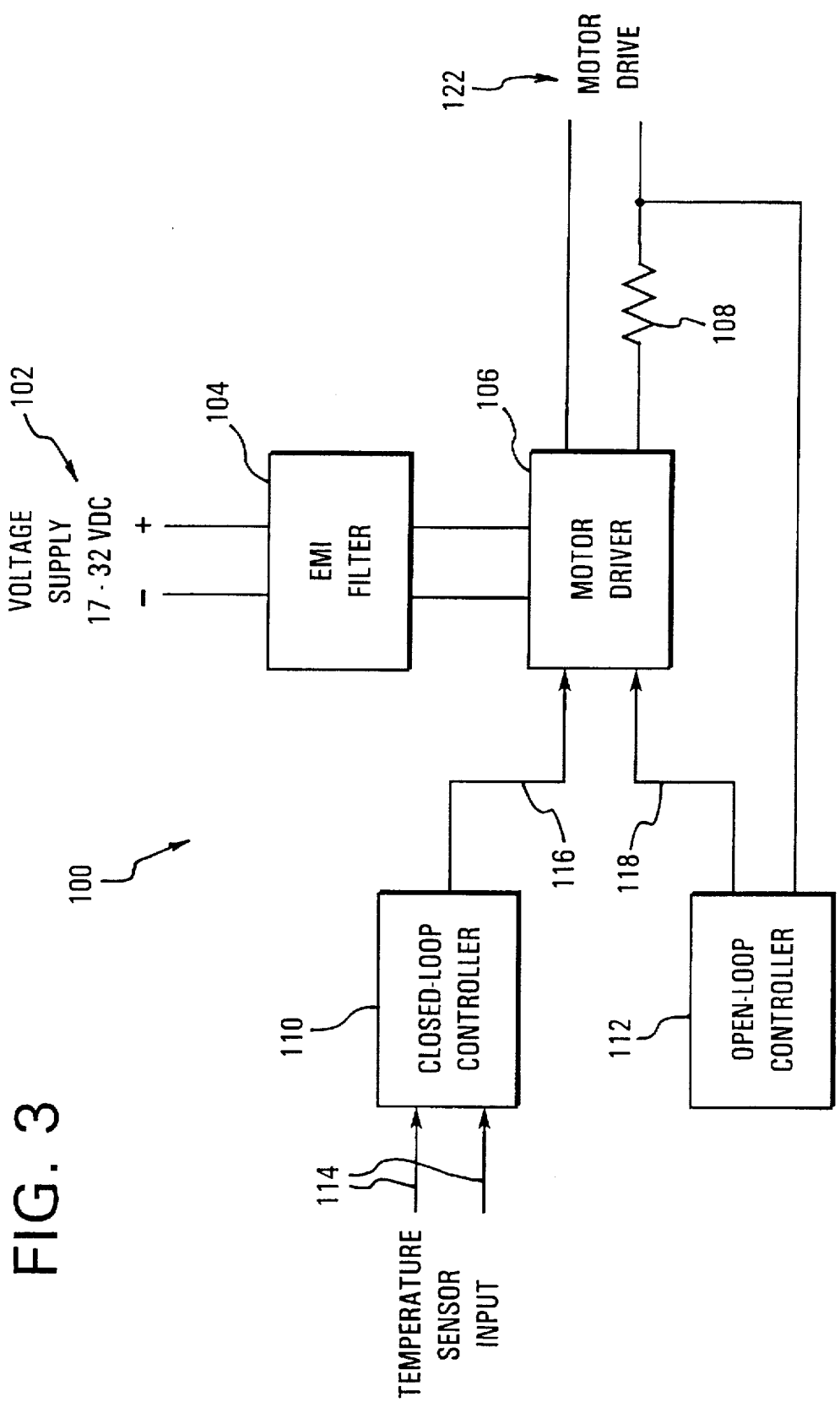
FIG. 3 is an Electronic Controller Block Diagram, according to a preferred embodiment of the present invention.

The details of Electronic Controller 56 are presented in FIG. 3. Electronic Controller Block Diagram 100 consists of four main sections: EMI Filter 104, Motor Driver 106, Closed-loop Controller 110 and Open-loop Controller 112. EMI Filter 104 provides electrical filtering to remove noise from Voltage Supply 102. Motor Driver 106 electronically converts the output signal pair of EMI Filter 104 to a phased 60 Hz drive signal pair which is Motor Drive output signal pair 122. Motor Drive output signal pair 122 drives the Motor/Compressor Assembly 52 of FIG. 2. Motor Drive output signal pair 122 is controlled by two controllers, Closed-Loop Controller 110 and Open-Loop Controller 112. The output signal 116 of Closed-Loop Controller 110 regulates DEWAR temperature by monitoring Temperature Sensor signal 114 and modulating 60 Hz Motor Drive output signal pair 122 which results in variation of the stroke of the compressor to change the amount of cooling supplied to the cold finger in order to regulate the temperature of the cold finger. Open-Loop Controller 112 provides a maximum power limit that the Motor 60 can use during cold finger cool-down or in the event of a cold finger temperature sensor failure. Open-Loop Controller 112 monitors the current through the Motor 60 of FIG. 2 by using the output signal of Current Sensor 108, and results in modulation of Motor Drive Output 122 when a preset limit is reached. By limiting the amount of current the motor can draw, maximum motor power can be controlled.

Figure 4:
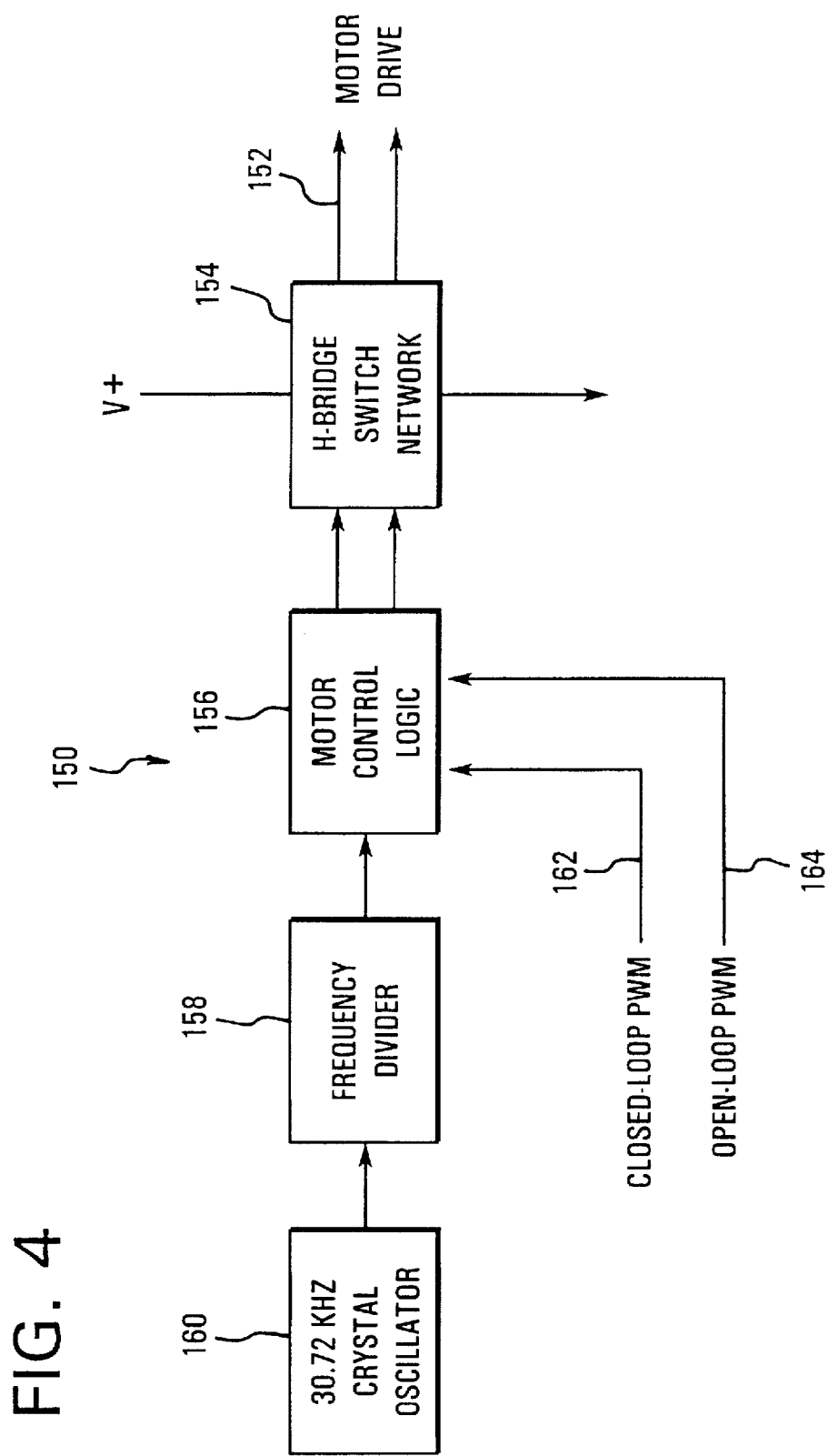
FIG. 4 is a Motor Driver Block Diagram, according to a preferred embodiment of the present invention.
Figure 5:
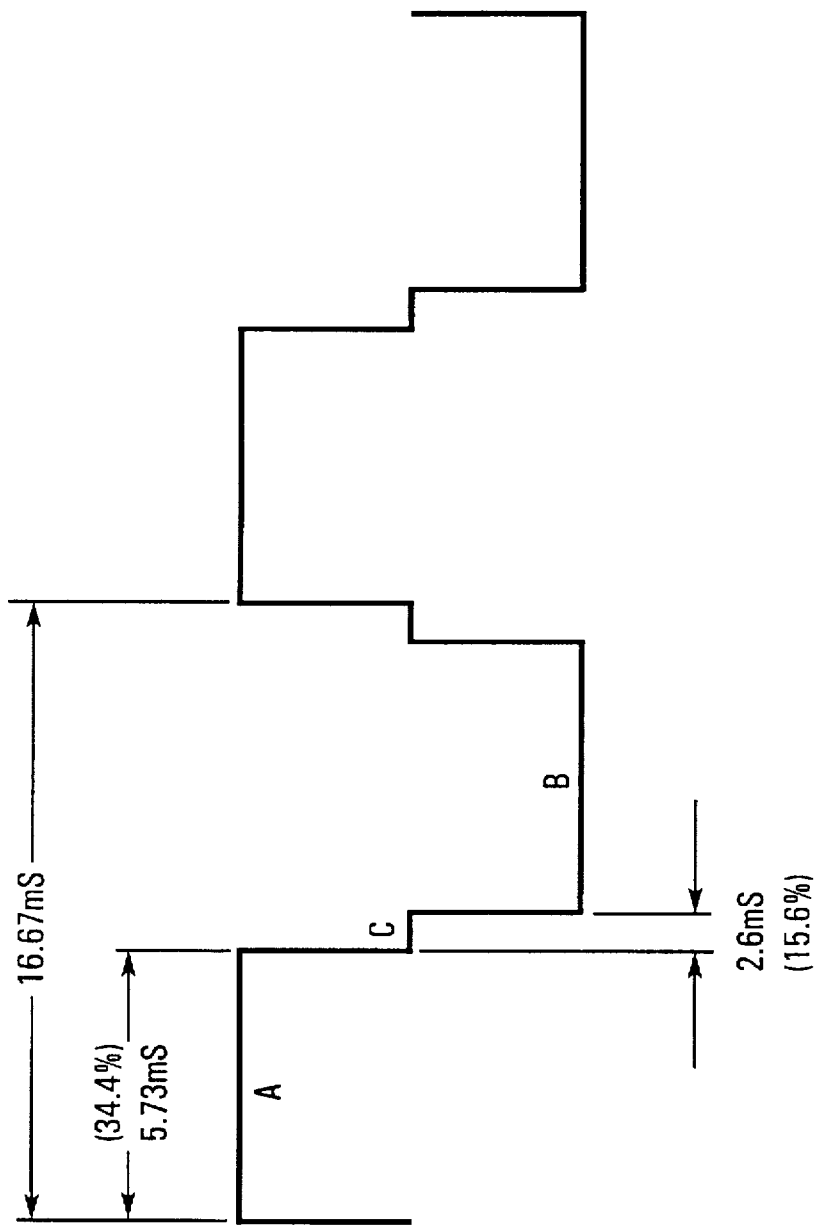
FIG. 5 is a graph of a Motor Drive Waveform, for description of the preferred embodiment.

The block diagram in FIG. 4 further explains Motor Driver 106. The motor resonance frequency selected is 60 Hz. Crystal Oscillator 160 is set to oscillate at 30.72 KHz, although other frequencies may be used depending on motor characteristics and Frequency Divider 158. A very stable oscillator is required to maintain this frequency over the environmental conditions in which many coolers operate. The output signal of Crystal Oscillator 160 is divided down by Frequency Divider 158 to 60 Hz in this example. Motor Control Logic 156 is then used to operate H-Bridge Switch Network 154, which generates Motor Drive output signal 152 which cycles the current through the motor coils, which is the waveform shown in FIG. 5. In the waveforms of FIG. 5, during interval A the motor coils will be pulled in towards each other. During interval B the current is reversed and the motor coils are forced apart. Interval C allows the energy in the coils to dissipate, thereby preventing large voltage spikes from occurring when reversing the current to the coils. Inputs to the motor driver are Closed-Loop PWM 162 and Open-Loop PWM 164, where PWM is Pulse-Width Modulation. Closed-Loop PWM 162 and Open-Loop PWM 164 are signals which are analogous to signal 116 and 118, respectively, of FIG. 3.

Figure 6:
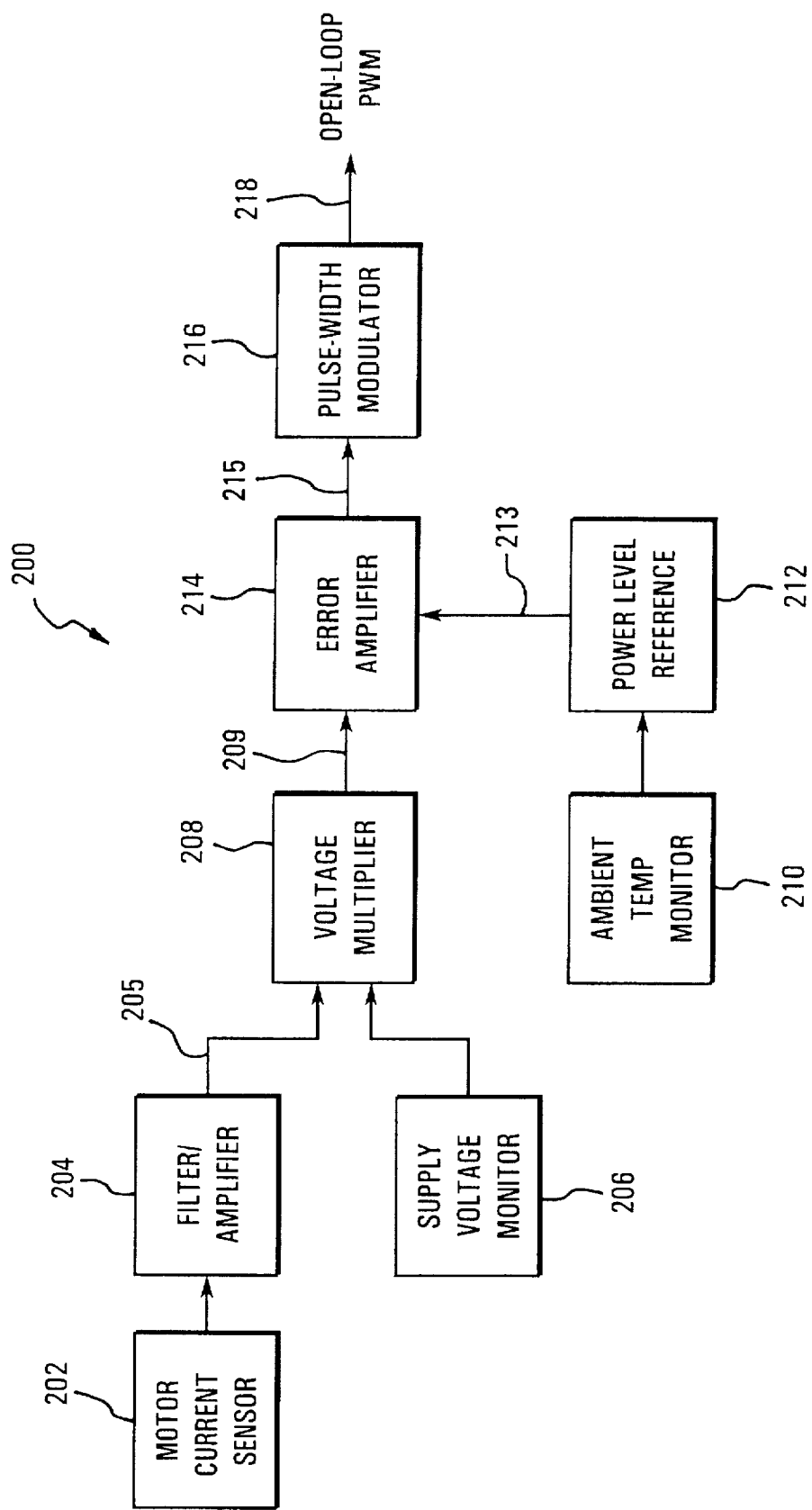
FIG. 6 is an Open-Loop Controller Block Diagram, according to a preferred embodiment of the present invention.
Figure 7:
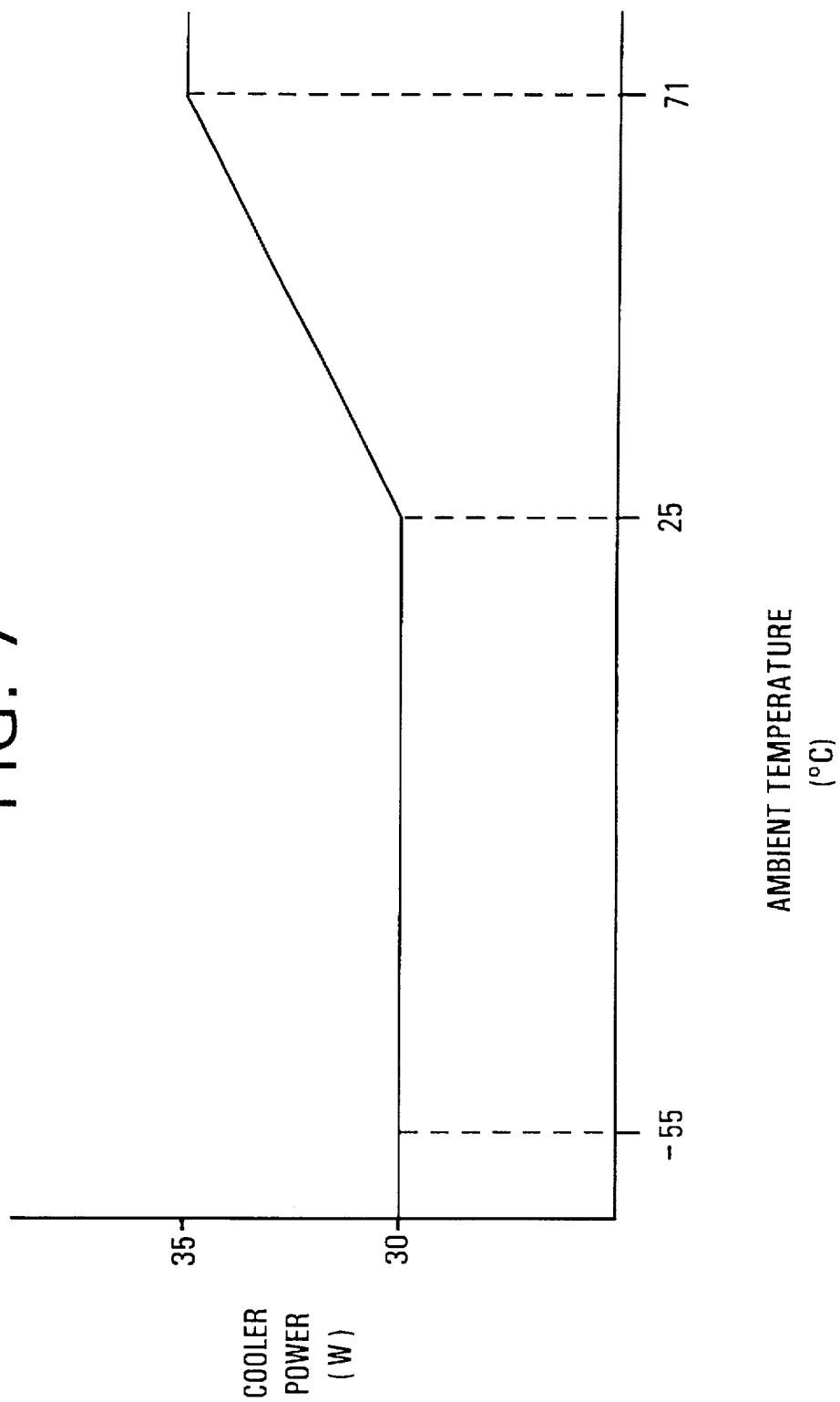
FIG. 7 is a graph of Typical Motor Power Limits (Open-Loop), for description of the preferred embodiment.

Referring to FIG. 6, Open-Loop Controller 200 limits the power to the motor at normal ambient temperature, and increases the power limit at elevated temperatures. This limit is maintained over a variable supply voltage range and variable load conditions. Motor Current Sensor 202 continuously monitors current through the motor coils. The sensor is typically a resistor placed in the low side of the motor driver, such as Current Sensor 108 of FIG. 3. As motor current flows through the resistor, a proportional voltage is developed across the resistor. Because it is a pulsed waveform, this voltage must be filtered by Filter/Amplifier 204, the characteristics of which are selected to obtain the fastest system response time to prevent overshoots and still provide smooth steady state operation. The output signal 205 of Filter/Amplifier 204 is then applied to Voltage Multiplier 208 where it is multiplied by Supply Voltage Monitor 206 to produce output signal 209. Output signal 209 is then applied to Error Amplifier 214, where output signal 209 is compared to the Preset Power Limit signal 213 obtained from Power Level Reference 212 and Ambient Temperature Monitor 210. The output signal 215 of Error Amplifier 214 is applied to Pulse-Width Modulator 216 which varies Pulse-Width Modulator Output signal 218 and throttles back the motor to maintain the preset power limit. The preset power limit is controlled by Ambient Temperature Monitor 210 which increases the setpoint as the cooler's ambient temperature increases. High and low limits are designed in to limit power independently at room and high temperatures. An example of this type of control is shown in FIG. 7. Open-loop PWM signal 218 of FIG. 6 is equal to Open-loop PWM signal 164 of FIG. 4.

Figure 8:
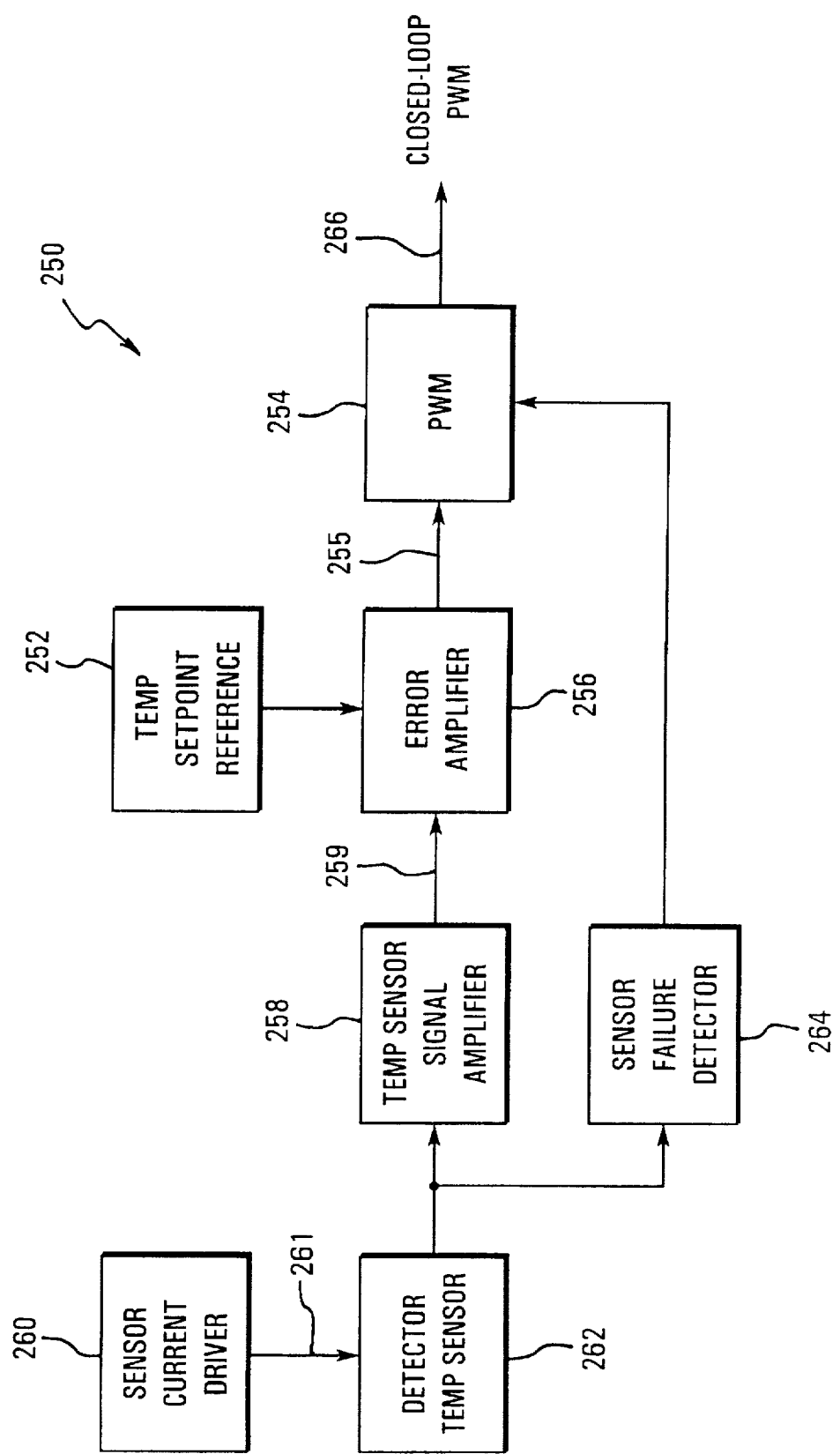
FIG. 8 is a Closed-Loop Controller Block Diagram, according to a preferred embodiment of the present invention.

Referring to FIG. 8, a block diagram of closed-loop controller 250 is shown. Sensor Current Driver 260 provides a constant bias source to bias Detector Temperature Sensor 262 so as to produce a voltage dependent only on temperature. Temperature Sensor Signal Amplifier 258 is used to measure the output of Detector Temperature Sensor 262. Error Amplifier 256 compares the output signal 259 of Temperature Sensor Signal Amplifier 258 to Temperature Setpoint Reference 252 which is selected to correspond to the desired control setpoint. Pulse-Width Modulator 254 receives the output signal 255 of Error Amplifier 256 and converts it to a controlled pulse width which is dependent on the magnitude of the error. Closed-Loop PWM 266 controls the motor by pulsing the on intervals of the motor drive signal utilizing pulses of variable width.

Figure 9:
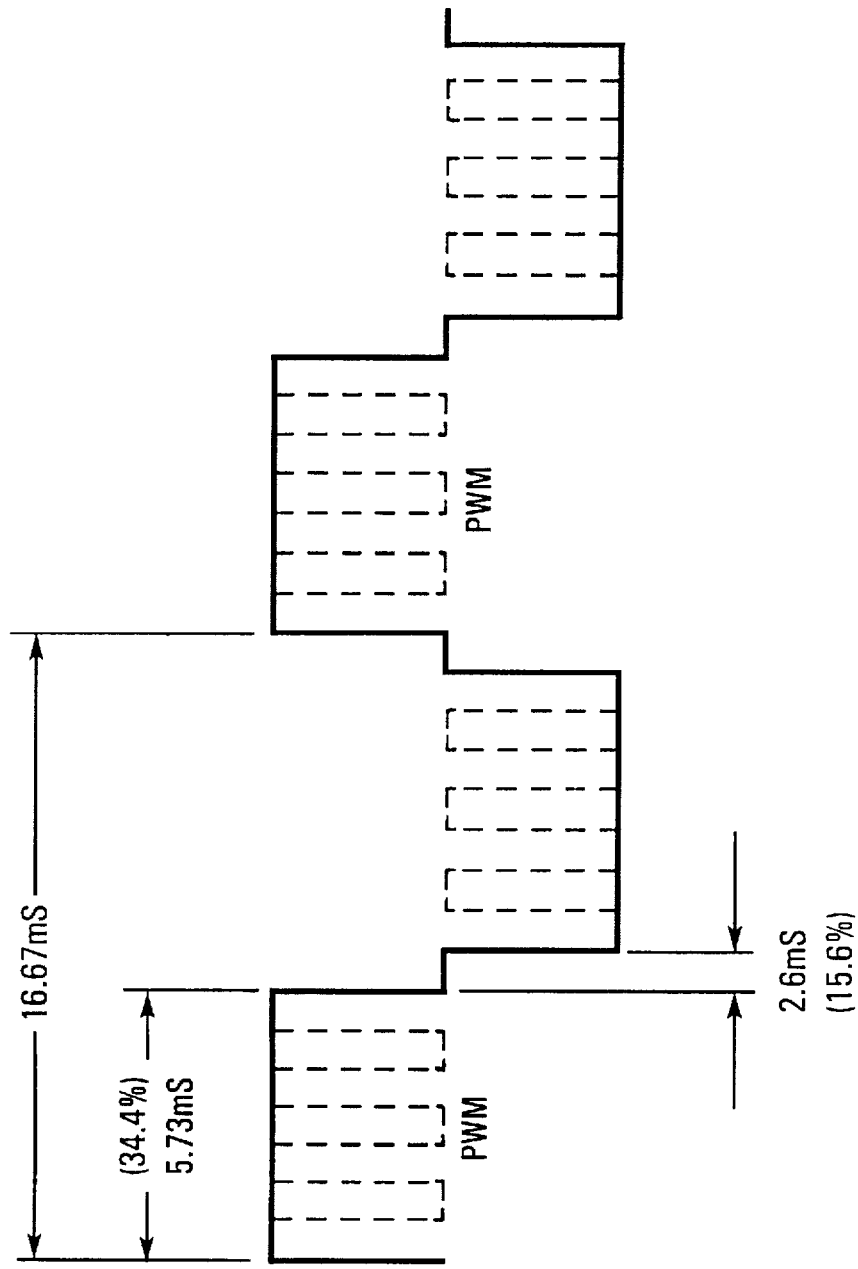
FIG. 9 is a graph of Motor Drive with Modulation, for description of the preferred embodiment.
Figure 11:
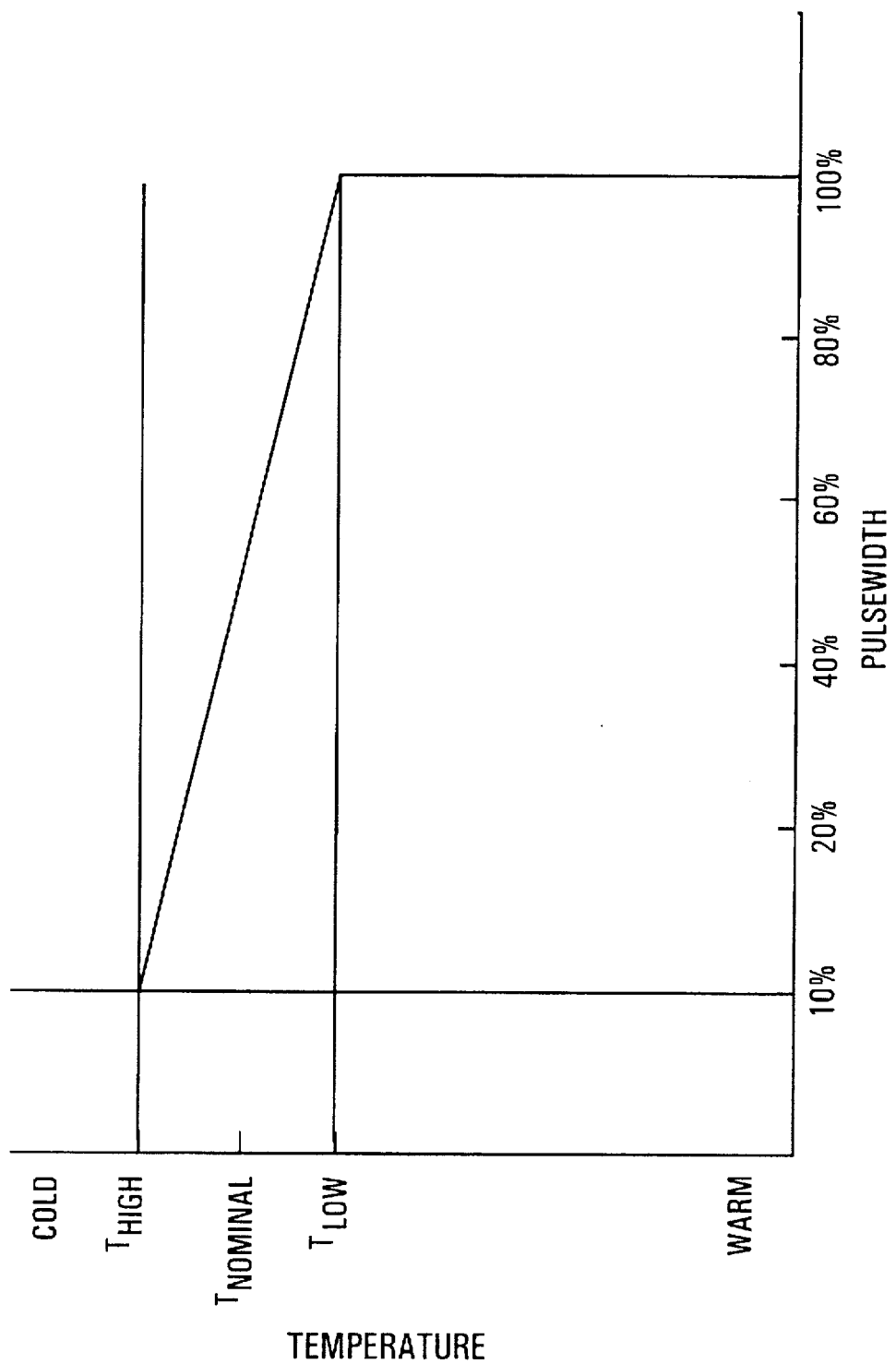
FIG. 11 is a graph of Temperature Control Zone vs. Pulse-Width Modulation, for description of the preferred embodiment.

FIG. 9 shows a motor drive waveform with modulation to illustrate the modulation technique of the motor driver. The required pulse width is dependent on cooling capacity and heat load. The larger the cooling capacity or the smaller the heat load, the shorter the pulse width. A shorter pulse width shortens the period of time voltage is applied to the motor. The cooler control loops described will reach steady-state operating conditions when the cold finger reaches the desired cryogenic temperature, and this operating point will automatically be maintained by vernier adjustment of modulating pulse width. Pulse-Width Modulator 254 frequency is selected to give a pulse width much smaller than the motor electrical and mechanical time constants to ensure smooth motor operation. The motor acts as a lowpass filter from the input voltage to the output load, which allows the Pulse-Width Modulator 254 to directly drive the motor. FIG. 10 shows the output pressure waveform of a motor/compressor driven by Closed-Loop PWM 266. The control zone for the cooler system was set at 100% pulse width for the low frequency end, and 10% pulse width for the high frequency end. These end points are connected linearly, with the normal temperature set at a 50% duty cycle. This places the nominal temperature setpoint in approximately the middle of the control zone. The control zone is shown in FIG. 11.

The above-described techniques are more amenable to miniaturized electronic implementation because less electronic circuitry is required, in particular regulators used in prior art to establish a constant operating voltage from a wide-range source, and less heat will be generated because of the higher efficiency.

Whereas prior art cooling system controllers changed the magnitude of the motor drive voltage, this invention uses a fixed amplitude and modulates the duty cycle. Additionally, this invention discloses a cooling system controller which combines both open-loop and closed-loop motor control techniques, to provide the aforementioned operational improvements of high efficiency operation from a wide-range voltage source in conjunction with automatic temperature sensor failure protection, whereas prior art U.S. Pat. No. 5,156,005 does not address a dual-loop configuration.

Since the present invention utilizes PWM techniques and not amplitude techniques to control the motor, a wide range of supply voltage can be accommodated without power inefficiency due to inclusion of voltage regulators in the power chain as done by prior art techniques. Prior art U.S. Pat. No. 5,156,005 does not address operation from a wide-range supply voltage source, instead requiring a fixed supply voltage.

While the invention has been particularly shown and described with reference to a preferred embodiment, it will be understood by those skilled in the art that various changes in form and detail may be made therein without departing from the spirit and scope of the invention.

What is claimed is:

1. A cryogenic cooler control system, comprising:
   an electronic controller supplied with a variable voltage source;
   a motor assembly containing a motor and a compressor, wherein the motor assembly is coupled to the electronic controller;
   an insulated assembly containing a cold finger which is insulated by the insulated assembly, an infrared detector, and a temperature sensor, wherein the cold finger of the insulated assembly is coupled to the motor assembly and the temperature sensor is coupled to the electronic controller;
   said electronic controller being further comprised of:
   (a) an electromagnetic interference (EMI) filter supplied with the variable voltage source which filters noise from the variable voltage source and produces an output signal;
   (b) a motor driver which converts the output signal of the EMI filter to a phased drive output signal which drives the motor of the motor assembly;
   (c) a closed-loop controller supplied with a temperature sensor signal which produces an output signal which couples the closed-loop controller to the motor driver and controls the phased drive output signal of the motor driver; and
   (d) an open-loop controller which produces an output signal which couples the open-loop controller to the motor driver and controls the phased drive output signal of the motor driver to limit the power to the motor at a normal ambient temperature and increases the power to a preset power limit to the motor at an elevated temperature;
   wherein the cold finger generates the refrigeration required to cool the infrared detector to a desired operating temperature and the electronic controller regulates the temperature of the infrared detector to a preset value.

2. The control system of claim 1, wherein the variable voltage source ranges from approximately 17 to 32 VDC.

3. The control system of claim 1, wherein the cold finger is coupled to the motor assembly by a transfer line.

4. The control system of claim 1, wherein the infrared detector and the temperature sensor are attached to a vacuum side of a glass tube of the insulated assembly.

5. The control system of claim 1, wherein the temperature sensor is coupled to the electronic controller through a temperature sensor signal.

6. The control system of claim 1, wherein the output signal of the closed-loop controller controls the phased drive output signal of the motor driver by monitoring the temperature sensor signal which results in variation of the stroke of the compressor to change the amount of cooling supplied to the cold finger in order to regulate the temperature of the cold finger.

7. The control system of claim 6, wherein the closed-loop controller further comprises:

a sensor current driver which produces a bias signal;

a temperature sensor supplied with the bias signal of the sensor current driver which biases the temperature sensor to produce an output signal dependent only on temperature;

a sensor failure detector, supplied with the output signal of the temperature sensor, which senses the failure of the temperature sensor and generates an output signal;

a signal amplifier, supplied with the output signal of the temperature sensor, which measures the output signal of the temperature sensor and produces an output signal;

a temperature setpoint reference which produces an output signal;

an error amplifier, supplied with the output signal of the signal amplifier and the output signal of the temperature setpoint reference, which compares the output signal of the signal amplifier and the output signal of the temperature setpoint reference and produces an output signal representative of an error between the output signal of the signal amplifier and the output signal of the temperature setpoint reference; and a pulse-width modulator, supplied with the output signal of the error amplifier and the output signal of the sensor failure detector, which converts the output signal of the error amplifier to a pulse having a width that is determined by the error between the output signal of the signal amplifier and the output signal of the temperature setpoint reference.

8. The control system of claim 1, wherein the output signal of the open-loop controller controls the phased drive output signal of the motor driver to provide the preset power limit that the motor can use during a failure of the temperature sensor.

9. The control system of claim 8, wherein the open-loop controller monitors the current through the motor through a current sensor coupled to the phased drive output signal of the motor driver and modulates the phased drive output signal of the motor driver when the preset power limit is reached.

10. The control system of claim 8, wherein the motor driver further comprises:

an oscillator which produces an oscillator output signal;

a frequency divider which divides the oscillator output signal and produces an output signal;

a motor control logic which is provided the output signal of the frequency divider, the output signal of the closed-loop controller, and the output signal of the open-loop controller as input signals and which produces an output signal; and a switch network which is provided the output signal of the motor control signal and which produces the phased drive output signal.

11. The control system of claim 10, wherein the switch network is an H-Bridge switch network.

12. The control system of claim 8, wherein the open-loop controller further comprises:

a motor current sensor which monitors current flowing through a motor coil of the motor and generates a pulsed voltage output signal which is proportional to the value of the motor current sensor;

a filter which filters the pulsed voltage output signal of the motor current sensor and produces an output signal;

a supply voltage monitor which generates a supply voltage monitor signal;

a voltage multiplier, having the output signal of the filter as an input signal, which multiplies the output signal of the filter by the supply voltage monitor signal to produce an output signal of the voltage multiplier;

an ambient temperature monitor;

a power level reference which is coupled to the ambient temperature monitor to produce a preset power limit signal representative of the preset power limit;

an error amplifier, supplied with the output signal of the voltage multiplier and the preset power limit signal, which compares the output signal of the voltage multiplier with the preset power limit signal and produces an output signal; and a pulse-width modulator, supplied with the output signal of the error amplifier, which generates the output signal of the open-loop controller, wherein the pulse-width modulator varies the output signal of the open-loop controller to throttle the motor in order to maintain the preset power limit.

13. The control system of claim 12, wherein the motor current sensor is the current sensor coupled to the phased drive output signal of the motor driver.

14. A circuit for controlling the pulse-width of the motor drive applied to an electrical motor for use in a cryogenic cooler having a compressor for compressing a refrigerant used to cool a cold finger of the cryogenic cooler, the control circuit comprising:

an electromagnetic interference (EMI) filter supplied with a variable voltage source which filters noise from the variable voltage source and produces an output signal;

a motor driver which converts the output signal of the EMI filter to a phased drive output signal which drives a motor of a motor assembly;

a closed-loop controller supplied with a sensor signal which produces an output signal which couples the closed-loop controller to the motor driver and controls the phased drive output signal of the motor driver; and an open-loop controller which produces an output signal which couples the open-loop controller to the motor driver and controls the phased drive output signal of the motor driver to limit the power to the motor at a normal ambient temperature and increases the power to a preset power limit to the motor at an elevated temperature.

15. The control circuit of claim 14, wherein the output signal of the closed-loop controller controls the phased drive output signal of the motor driver by monitoring the sensor signal which results in variation of the stroke of a compressor of the motor assembly.

16. The control circuit of claim 15, wherein the closed-loop controller further comprises:

a sensor current driver which produces a bias signal;

a sensor supplied with the bias signal of the sensor current driver which biases the sensor to produce an output signal dependent only on what is being sensed by the sensor;

a sensor failure detector, supplied with the output signal of the sensor, which senses the failure of the sensor and generates an output signal;

a signal amplifier, supplied with the output signal of the sensor, which measures the output signal of the sensor and produces an output signal;

a setpoint reference which produces an output signal;

an error amplifier, supplied with the output signal of the signal amplifier and the output signal of the setpoint reference, which compares the output signal of the signal amplifier and the output signal of the setpoint reference and produces an output signal representative of an error between the output signal of the signal amplifier and the output signal of the setpoint reference; and a pulse-width modulator, supplied with the output signal of the error amplifier and the output signal of the sensor failure detector, which converts the output signal of the error amplifier to a pulse having a width that is determined by the error between the output signal of the signal amplifier and the output signal of the setpoint reference.

17. The control circuit of claim 14, wherein the output signal of the open-loop controller controls the phased drive output signal of the motor driver to define the preset power limit available to the motor.

18. The control circuit of claim 17, wherein the open-loop controller monitors the current through the motor through a current sensor coupled to the phased drive output signal of the motor driver and modulates the phased drive output signal of the motor driver when the preset power limit is reached.

19. The control circuit of claim 17, wherein the motor driver further comprises:

an oscillator which produces an oscillator output signal;

a frequency divider which divides the oscillator output signal and produces an output signal;

a motor control logic which is provided the output signal of the frequency divider, the output signal of the closed-loop controller, and the output signal of the open-loop controller as input signals and which produces an output signal; and a switch network which is provided the output signal of the motor control signal and which produces the phased drive output signal.

20. The control circuit of claim 19, wherein the switch network is an H-Bridge switch network.

21. The control circuit of claim 17, wherein the open-loop controller further comprises:

a motor current sensor which monitors current flowing through a motor coil of the motor and generates a pulsed voltage output signal which is proportional to the value of the motor current sensor;

a filter which filters the pulsed voltage output signal of the motor current sensor and produces an output signal;

a supply voltage monitor which generates a supply voltage monitor signal;

a voltage multiplier, having the output signal of the filter as an input signal, which multiplies the output signal of the filter by the supply voltage monitor signal to produce an output signal of the voltage multiplier;

an ambient temperature monitor;

a power level reference which is coupled to the ambient temperature monitor to produce a preset power limit signal representative of the preset power limit;

an error amplifier, supplied with the output signal of the voltage multiplier and the preset power limit signal, which compares the output signal of the voltage multiplier with the preset power limit signal and produces an output signal; and a pulse-width modulator, supplied with the output signal of the error amplifier, which generates the output signal of the open-loop controller, wherein the pulse-width modulator varies the output signal of the open-loop controller to throttle the motor in order to maintain the preset power limit.

22. The control circuit of claim 21, wherein the motor current sensor is the current sensor coupled to the phased drive output signal of the motor driver.

* * * * *